2,990,372
PROCESS FOR THE PRODUCTION OF SILICON OF HIGH PURITY

János E. Pintér and Béla Sallay, Budapest, Hungary, assignors to Egyesült Izzólámpa és Villamossági Részvénytársaság, Budapest, Hungary, a firm
No Drawing. Filed Sept. 24, 1957, Ser. No. 685,822
Claims priority, application Hungary Sept. 28, 1956
17 Claims. (Cl. 252—62.3)

The present invention relates to a process for the production of silicon of high purity which is suitable more especially for the production of semi-conductors. The invention also includes semi-conductor elements, such for example as diodes, transistors and the like, which are produced from this silicon.

It has been observed that silicon has more advantageous properties than germanium in particular fields of application. Thus, for example, it has lower sensitivity to heat, a higher inverse voltage and the like, by reason of which the field of application of the substance can be substantially widened. Silicon diodes and silicon transistors have therefore recently gained prominence instead of germanium diodes and germanium transistors. The use of silicon is also facilitated by reason of the fact that it is of substantially lower cost than germanium. Moreover, silicon is available in greater quantities than germanium.

However, for the aforesaid purposes a silicon having a particularly high degree of purity is required, to which semi-conductor properties can be imparted by the addition of so-called dopes, such for example as elements of group III or V of the periodic system.

Various methods of producing silicon in a high degree of purity are known. In one of these methods, $SiCl_4$ is produced from $SiO_2$ by means of chlorine, whereafter this relatively impure liquid is purified by fractional distillation. The relatively pure $SiCl_4$ thus obtained is subjected to a thermal reduction, in which Zn in the vapour phase is employed as reducing substance. The degree of purity of the Zn employed for this purpose decisively influences the degree of purity of the final product. In another known method, ferrosilicon is employed as the initial material, and a large part of the impurity in this substance is removed by repeated treatment with mineral acids. The substance thus obtained is then melted and, if it has not the desired degree of purity, the purification is repeated after the pulverizing process. This purifying process is continued until the desired degree of purity is attained. However, it is not possible to obtain the same purity by this process as by the first-mentioned process.

A common disadvantage of the known processes resides in their long duration, and in the fact that costly refractory and acid-resistant equipment which prevents the introduction of foreign substances forming impurities is required, whereby the cost of the process is increased. In addition, the degree of purity attainable by these processes is in most cases insufficient.

The primary object of the invention is to avoid the aforesaid disadvantages.

A further object of the invention is to produce silicon having a particularly high degree of purity, which already contains the predetermined quantity of foreign substances having the required quality.

Still another object of the invention is the production of silicon being directly suitable for the production of semi-conductor elements, such for example as diodes and transistors.

The invention is based upon the observation that the solubility of the substances present in the silicon, and which contaminate the latter, is different in the various metals, and the substances producing the impurity can thus be removed from the metal melt by crystallization. A further new observation resides in that the crystallization is effected from a metal melt which can product semi-conductor properties in the silicon, so that as a result of the crystallization a silicon is produced which is suitable for the direct production of semi-conductor elements.

The process according to the invention is characterized in that at least technically pure silicon is dissolved in a metal and crystallized therefrom. There is preferably employed for the crystallization the melt of a metal which is suitable for the doping of the silicon, or such a substance is added to the metal melt employed for the crystallization.

Ferrosilicon is advantageously employed as the initial substance in carrying out the process according to the invention. This initial substance is dissolved in a metal melt and crystallized therefrom. The impurities are concentrated in the metal melt, since their solubility is greater in the metal employed as solvent than in silicon. If the metal employed for the dissolution is so chosen that its solubility in silicon is low and any metal atoms incorporated can be readily evaporated by remelting in vacuo, completely pure undoped silicon is obtained. On the other hand, if the metal suitable for the dissolution is itself suitable for the doping, the quantity of dope introduced into the silicon can be varied by appropriately controlling the crystallization. It is also possible to employ a neutral metal for the dissolution, but in this case a suitable dope must be added in appropriately concentrated form.

Experiments have shown that metals having a relatively low melting point, for example zinc, but having no doping properties, may primarily be employed with advantage as the metal for the dissolution. In the course of the experiments, alloys were also employed, one component of which was suitable for the doping, for example, a zinc aluminium alloy, or a zinc-aluminium melt. However, other metals, for example alkaline-earth metals, or magnesium, tin, chromium and the like may naturally also be employed either alone or together with a substance having doping properties, or in the form of alloys. Naturally metal alloys, for example zinc-magnesium or calcium-magnesium are also suitable. Pure aluminuim or an aluminium-gallium or an aluminium-indium alloy may also be employed, in which case the metal solvent is itself suitable for the doping. For the purpose of producing n-type properties, zinc-antimony or zinc-arsenic or molten mixtures may also be employed as the solvent metal.

An embodiment of the invention will hereinafter be described by way of examples.

*Example 1.*—A mixture consisting of 120 grams of ferrosilicon, 30 grams of aluminium and 1000 grams of zinc is melted in an electric furnace at a temperature of 700–1200° C., while being washed with dry nitrogen. The initial materials, that is, more especially the aluminium and the zinc, must have a high degree of purity. The melt is allowed to stand in the molten state with constant washing with nitrogen, the added ferrosilicon going into solution. The slag formed is removed from the melt, whereafter the temperature of the furnace is slowly reduced. The cooling is continued until the melt solidifies, for which purpose from two to three hours are required, depending upon the crystal size.

During the cooling, crystal concentrations are formed in the silicon, the slow growth of which ensures that the impurities originally present, such for example as iron, copper, manganese, carbon, alkaline-earth metals and the like, are concentrated in the dissolving metal and the silicon crystallized out is several times purer than the initial substance. At the same time, traces (at most several hundredths of one percent) of the metal solvent are introduced into the silicon crystals separated off, together with the doping aluminium.

For recovering the crystallized highly purified silicon formed, the metal solvent or the metal alloy is dissolved together with the impurities by means of dilute hydrochloric acid. The insoluble residue is the silicon which remains in beautiful crystals of needle form. The surface of these crystals contains more of the metal solvent than the interior of the crystals. In order to remove the residues of the metal solvent, an intensive washing is effected with acid. The crystals are advantageously first washed with hydrochloric acid, then with water, thereafter with hydrofluoric acid and finally with a mixture consisting of nitric acid and hydrofluoric acid. This treatment with the aforesaid acids may last a number of hours, the crystals finally being again washed with distilled water. Depending upon the rate of cooling, larger or smaller quantities of the metal solvent are occluded, which can then be removed if necessary by boiling in vacuo. The residual quantity of the doping substance can also be regulated by this boiling in vacuo.

By means of the process according to the invention, a silicon can be produced having a 99.9999% purity calculated on the original impurities, the silicon containing, in dependence upon the duration of the boiling in vacuo, residual traces of the solvent metal in a concentration of $10^{-4}$ to $10^{-8}$% as also the corresponding quantities of the doping substance.

Depending upon the rate of the cooling, two types of end product can be obtained. If the cooling is slowly effected, crystals directly suitable for semi-conductor elements can be obtained, from which diodes of high quality can be produced. If the cooling is rapidly effected, silicon suitable for immediate use is generally obtained merely by boiling in vacuo or by remelting in vacuo.

*Example 2.*—Producing an n-type silicon semi-conductor body the solving is to be effected in a zinc-antimony alloy which is to be prepared by using 216 g. distillated zinc metal having a 99.99 purity and 20 g. antimony of the same purity. The alloy prepared is to be mixed with 30 g. of technically pure ferrosilicon. The mixture is melted in an electric furnace at a temperature of about 940° C. while being washed with dry hydrogen or a suitable inert gas such as nitrogen. The solving procedure takes place within 5–10 minutes. The melt is afterwards cooled and the silicon crystallized under equal circumstances as in Example 1.

The further treatment of the silicon is to be effected according to Example 1.

*Example 3.*—For the production of a p-type semi-conducting material adapted to be used for point contact diodes and transistors a zinc-calcium alloy is to be used as a dissolving metal. For this purpose 150 g. metallic zinc and 40 g. metallic calcium, both of 99.99 purity are to be melted and alloyed in a pot made of zircon dioxide base material at a temperature between 500 and 700° C. while being washed with spectrally pure argon gas. 150 g. of said zinc-calcium alloy are used as a solvent for 25 g. of ferrosilicon. The technically pure ferrosilicon is placed on the bottom of the melting pot and the zinc-calcium alloy is put over said silicon. Heating said mixture a dissolution begins at a temperature of about 650° C. and takes about 20–80 minutes according to the applied temperature. During melting washing with spectrally pure argon is necessary. The cooling, crystallization and further treatment of the silicon is the same as in Example 1.

Although the invention has hereinbefore been described only with reference to said embodiments these embodiments have no limiting character. Both the metals employed for the dissolution and the doping materials may be substances or elements known for this purpose but different from those mentioned in the foregoing, while various types of silicon may be employed as initial material. The degree of purity of the silicon can be further increased by repeating the process.

Having now particularly described and ascertained the nature of our invention and in what manner the same is to be performed, we declare that what we claim is:

1. A process for producing silicon semi-conductor material, comprising dissolving at least technically pure silicon at a temperature in the range of 700°–1200° C., in a metallic melt used in an amount sufficient for dissolution of the silicon and suitable for crystallization of the silicon upon cooling, said metal melt being of a melt-forming metal selected from the group consisting of zinc, alkaline earth metals, magnesium, tin, chromium, and alloys of these metals; including in the melt a dope for the silicon semi-conductor; slowly reducing the temperature of the melt including the silicon and dope in order to cause crystallization of the silicon and dope and solidification of the melt; and separating the crystallized dope containing silicon by dissolving the non-silicon ingredients of the solidified melt in an acid the melt-forming metal of the metallic melt-silicon solution being present as the principal component of the solution based on the metal-forming metal and silicon content of said solution.

2. A process according to claim 1, in which the silicon is used in the form of ferrosilicon as starting material.

3. A process according to claim 1, in which the solidified melt is dissolved in hydrochloric acid.

4. A process according to claim 1, in which the crystallized silicon is submitted to a heat-treatment under vacuum, in order to remove non-silicon ingredients from the silicon crystals.

5. A process according to claim 1, in which ferrosilicon, pure aluminum as a dope and pure zinc are used as starting materials.

6. A process according to claim 1, in which the melt-forming metal is zinc.

7. A process according to claim 1, in which the melt-forming metal is an alloy composed principally of zinc.

8. A process according to claim 3, in which the silicon crystals which remain undissolved in hydrochloric acid, are washed with acid and water.

9. A process according to claim 8, in which the alloy is of zinc and a doping metal.

10. A process according to claim 9, in which the technically pure silicon is ferrosilicon.

11. A process according to claim 9, in which the doping metal is aluminum.

12. A process according to claim 9, in which the doping metal is magnesium.

13. A process according to claim 9, in which the doping metal is antimony.

14. A process according to claim 9, in which the doping metal is arsenic.

15. A process according to claim 9, in which the doping metal is calcium.

16. A process for producing silicon semi-conductor material, comprising dissolving at least technically pure silicon at a temperature in the range of 700°–1200° C., in a metallic melt used in an amount sufficient for dissolution of the silicon and suitable for crystallization of the silicon upon cooling, said metallic melt being of a melt-forming metal selected from the group consisting of zinc, alkaline earth metals, magnesium, tin, chromium, and alloys of these metals; including in the melt a dope for the silicon semi-conductor; slowly reducing the temperature of the melt including the silicon and dope in order to cause crystallization of the silicon and dope and solidification of the melt; and separating the silicon therefrom, the melt-forming metal component of the melt-silicon solution comprising about 85–90% of the solution and the silicon comprising about 10–15% of the solution.

17. A process according to claim 16, in which said metal is zinc.

(References on following page)

References Cited in the file of this patent

UNITED STATES PATENTS

| | | |
|---|---|---|
| 2,402,582 | Scaff | June 25, 1946 |
| 2,469,418 | Striplin | May 10, 1949 |
| 2,747,971 | Hein | May 29, 1956 |
| 2,866,701 | Strauss | Dec. 30, 1958 |
| 2,885,364 | Swartz | May 5, 1959 |

OTHER REFERENCES

Mellor: "A Comprehensive Treatise on Inorganic and Theoretical Chemistry," vol. 6, p. 149 (1925).

UNITED STATES PATENT OFFICE
CERTIFICATE OF CORRECTION

Patent No. 2,990,372 June 27, 1961

János E. Pintér et al.

It is hereby certified that error appears in the above numbered patent requiring correction and that the said Letters Patent should read as corrected below.

Column 4, line 22, for "metal" read -- melt --; line 42, for the claim reference numeral "8" read -- 7 --.

Signed and sealed this 14th day of November 1961.

(SEAL)
Attest:

ERNEST W. SWIDER
Attesting Officer

DAVID L. LADD
Commissioner of Patents

USCOMM-DC